(12) United States Patent
Westerman, Jr. et al.

(10) Patent No.: US 8,935,286 B1
(45) Date of Patent: Jan. 13, 2015

(54) INTERACTIVE SYSTEM FOR MANAGING PARTS AND INFORMATION FOR PARTS

(75) Inventors: Everett A. Westerman, Jr., Auburn, WA (US); Allison N. Deal, Seattle, WA (US); Scott Bridgford, Everett, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 13/162,217

(22) Filed: Jun. 16, 2011

(51) Int. Cl.
*G06F 17/30* (2006.01)

(52) U.S. Cl.
USPC ............... 707/780; 707/956; 705/28; 705/29

(58) Field of Classification Search
USPC ................. 707/705, 780, 956; 705/28, 29
See application file for complete search history.

(56) References Cited

U.S. PATENT DOCUMENTS

| | | | | |
|---|---|---|---|---|
| 5,334,822 A * | 8/1994 | Sanford | 705/28 |
| 5,839,112 A * | 11/1998 | Schreitmueller et al. | 705/4 |
| 6,338,045 B1 * | 1/2002 | Pappas | 705/29 |
| 6,611,840 B1 * | 8/2003 | Baer et al. | 715/270 |
| 6,840,451 B2 * | 1/2005 | Allen | 235/462.09 |
| 6,871,147 B2 * | 3/2005 | Schlager et al. | 702/19 |
| 7,042,346 B2 * | 5/2006 | Paulsen | 340/438 |
| 7,062,509 B1 * | 6/2006 | Nenov et al. | 1/1 |
| 7,167,786 B2 | 1/2007 | Sinex | |
| 7,284,007 B1 * | 10/2007 | Francicus de Heer et al. | 1/1 |
| 7,567,948 B2 * | 7/2009 | Kitayama et al. | 706/62 |
| 7,587,300 B2 * | 9/2009 | Dohiwa et al. | 702/184 |
| 7,642,086 B2 * | 1/2010 | Okamoto | 435/287.2 |
| 7,689,329 B2 | 3/2010 | Avery et al. | |
| 7,734,644 B2 * | 6/2010 | Gras | 707/770 |
| 7,818,148 B2 * | 10/2010 | Carey | 703/2 |
| 7,881,986 B1 * | 2/2011 | Pape et al. | 705/28 |
| 8,024,064 B1 * | 9/2011 | Sanghavi et al. | 700/226 |
| 8,065,353 B2 * | 11/2011 | Eckhoff-Hornback et al. | 705/16 |
| 8,442,876 B1 * | 5/2013 | Rogers et al. | 705/28 |
| 8,463,805 B2 * | 6/2013 | Osborn et al. | 707/765 |
| 2002/0082959 A1 * | 6/2002 | Barnard et al. | 705/29 |
| 2002/0099631 A1 * | 7/2002 | Vanker et al. | 705/28 |
| 2002/0122573 A1 * | 9/2002 | Eraslan | 382/118 |
| 2002/0152043 A1 * | 10/2002 | Skidmore | 702/84 |
| 2002/0169697 A1 * | 11/2002 | Hicks et al. | 705/28 |
| 2002/0174040 A1 * | 11/2002 | Hurt et al. | 705/28 |
| 2003/0069656 A1 * | 4/2003 | Minami et al. | 700/95 |
| 2003/0083770 A1 * | 5/2003 | Williamson | 700/117 |
| 2003/0117076 A1 * | 6/2003 | Nemoto et al. | 315/39 |
| 2003/0191699 A1 * | 10/2003 | Deveault et al. | 705/28 |
| 2003/0227392 A1 * | 12/2003 | Ebert et al. | 340/825.49 |
| 2004/0004999 A1 * | 1/2004 | Koerner et al. | 375/224 |
| 2004/0024781 A1 * | 2/2004 | Youd | 707/104.1 |

(Continued)

FOREIGN PATENT DOCUMENTS

| | | | | |
|---|---|---|---|---|
| JP | 2004-362456 | * | 12/2004 | G06F 17/50 |
| JP | 2009-093405 | * | 4/2009 | G06F 17/30 |

*Primary Examiner* — Phuong Thao Cao
(74) *Attorney, Agent, or Firm* — Yee & Associates, P.C.

(57) ABSTRACT

A method and apparatus for managing parts. A number of identifiers is received for an unidentified part. A determination is made as to whether the number of identifiers sufficiently matches a number of corresponding identifiers in a plurality of identifiers in a code stored in a database of codes associated with parts. The code is associated with the part. In response to the number of identifiers matching the number of corresponding identifiers in the plurality of identifiers in the code, a repository storing related information for the parts is accessed to obtain the related information for the part using a code identified for the part.

18 Claims, 8 Drawing Sheets

(56) References Cited

U.S. PATENT DOCUMENTS

| | | | |
|---|---|---|---|
| 2004/0138771 A1* | 7/2004 | Mok et al. | 700/95 |
| 2004/0167651 A1* | 8/2004 | Carey | 700/98 |
| 2004/0167833 A1* | 8/2004 | Schickler | 705/28 |
| 2004/0181464 A1* | 9/2004 | Vanker et al. | 705/26 |
| 2004/0193437 A1* | 9/2004 | Dohiwa et al. | 705/1 |
| 2005/0119941 A1* | 6/2005 | James | 705/26 |
| 2006/0167760 A1* | 7/2006 | Chakraborty et al. | 705/26 |
| 2006/0229757 A1* | 10/2006 | Minami et al. | 700/107 |
| 2006/0248351 A1* | 11/2006 | Booz et al. | 713/189 |
| 2007/0092897 A1* | 4/2007 | Okamoto | 435/6 |
| 2007/0114280 A1* | 5/2007 | Coop et al. | 235/385 |
| 2007/0205280 A1* | 9/2007 | Bowe et al. | 235/385 |
| 2008/0110011 A1* | 5/2008 | Reed et al. | 29/563 |
| 2008/0154876 A1* | 6/2008 | Hao | 707/5 |
| 2008/0167884 A1* | 7/2008 | Mountz et al. | 705/1 |
| 2009/0157532 A1* | 6/2009 | Shiner et al. | 705/28 |
| 2009/0271354 A1* | 10/2009 | Kitayama et al. | 706/47 |
| 2009/0307527 A1* | 12/2009 | Robbins et al. | 714/15 |
| 2009/0312897 A1 | 12/2009 | Jamrosz et al. | |
| 2010/0017330 A1* | 1/2010 | Tan | 705/50 |
| 2010/0083252 A1* | 4/2010 | Eide et al. | 718/100 |
| 2010/0106521 A1* | 4/2010 | Ashrafzadeh et al. | 705/3 |
| 2010/0114955 A1* | 5/2010 | Thayer | 707/780 |
| 2010/0125907 A1* | 5/2010 | Jonsson | 726/18 |
| 2010/0169336 A1* | 7/2010 | Eckhoff-Hornback et al. | 707/758 |
| 2010/0223309 A1* | 9/2010 | Benari | 707/912 |
| 2010/0274867 A1* | 10/2010 | Sawada | 709/208 |
| 2010/0312860 A1* | 12/2010 | Lohstoeter | 709/219 |
| 2011/0010276 A1* | 1/2011 | Bowser et al. | 705/29 |
| 2011/0047181 A1* | 2/2011 | Malnati et al. | 707/780 |
| 2011/0147369 A1* | 6/2011 | Spooner et al. | 219/552 |
| 2011/0161182 A1* | 6/2011 | Racco | 705/14.73 |
| 2011/0173093 A1* | 7/2011 | Psota et al. | 705/26.35 |
| 2012/0030241 A1* | 2/2012 | Lupoli et al. | 707/780 |
| 2012/0160957 A1* | 6/2012 | Gagne et al. | 244/54 |
| 2012/0239695 A1* | 9/2012 | Merino Gonzalez et al. | 707/780 |
| 2013/0066745 A1* | 3/2013 | de Heer et al. | 705/26.62 |

* cited by examiner

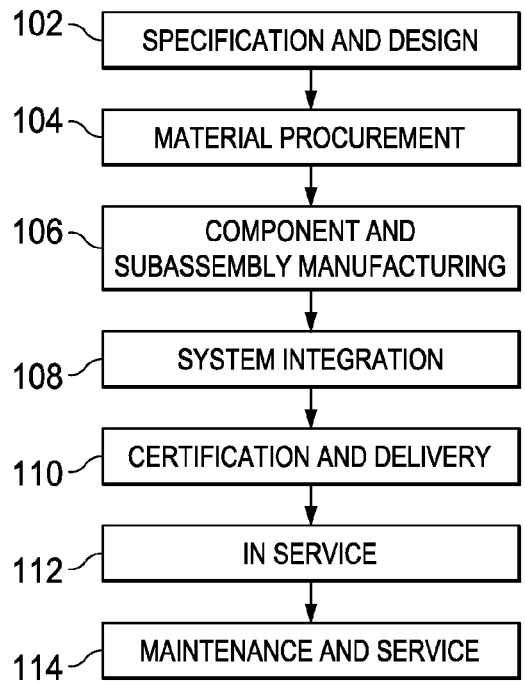
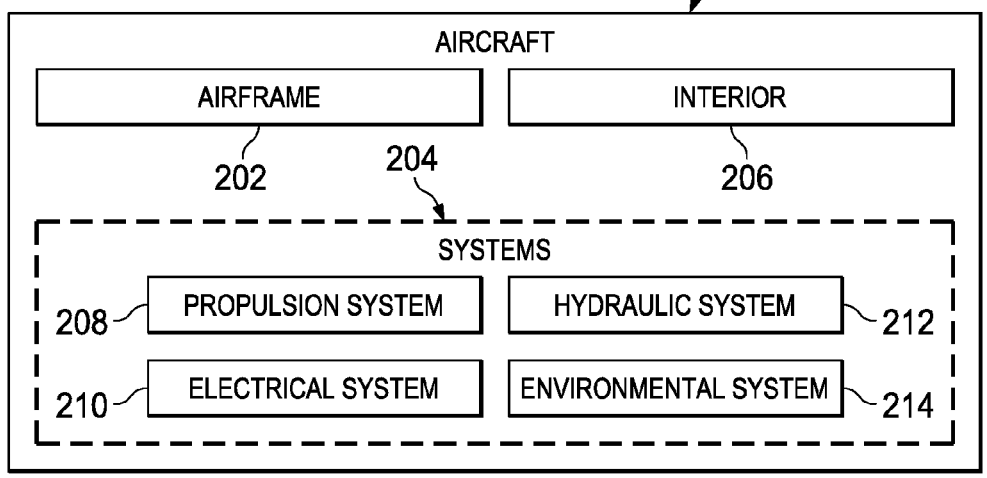

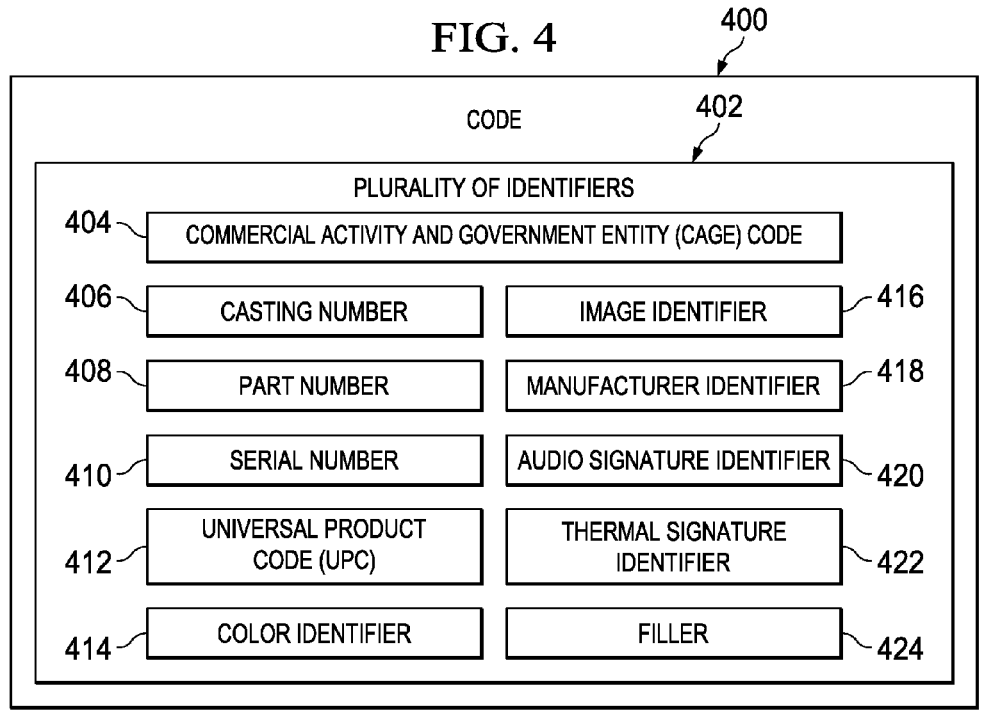
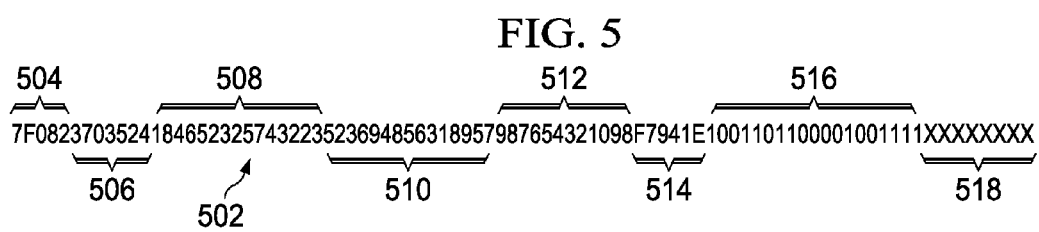

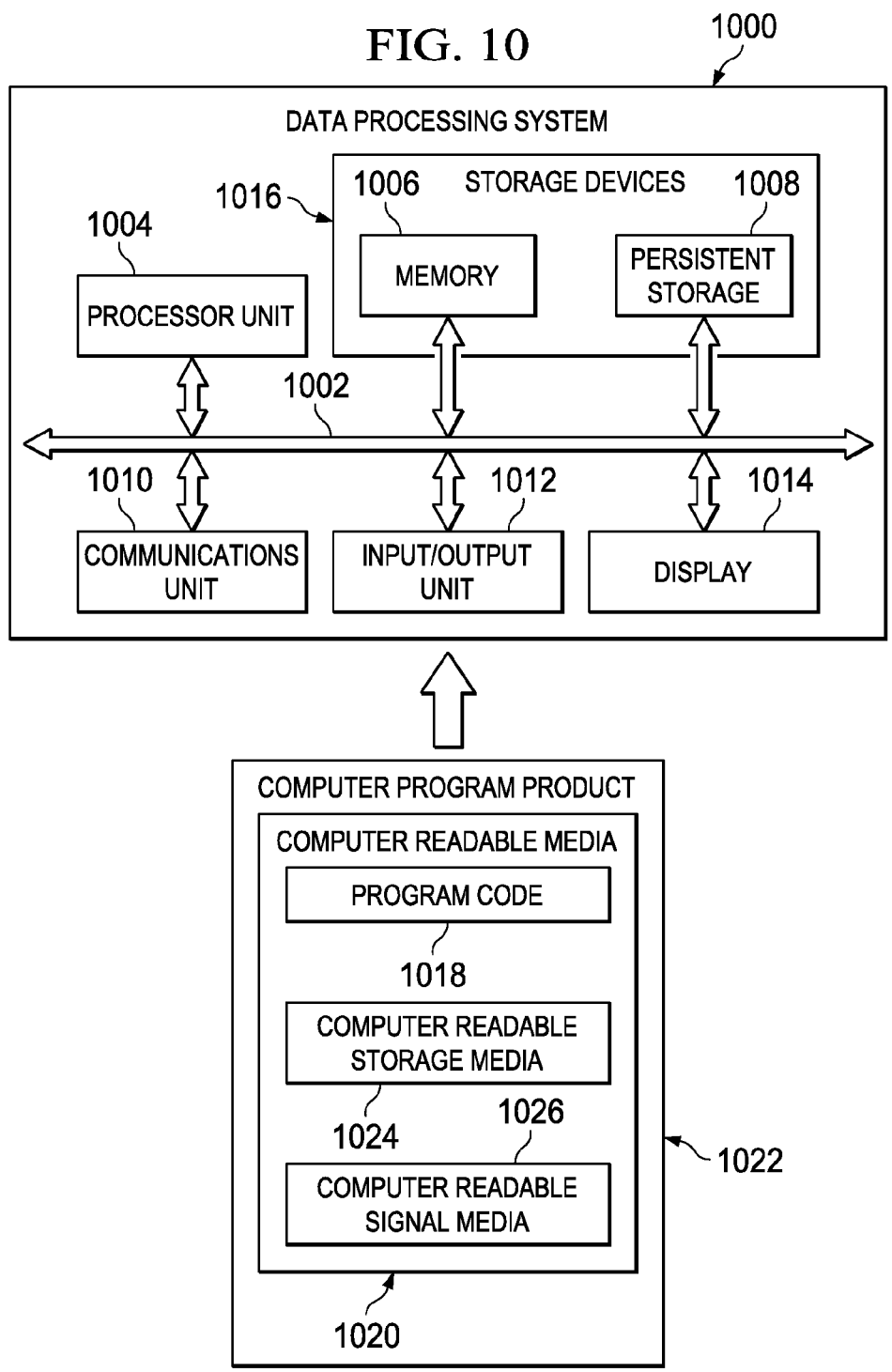

INTERACTIVE SYSTEM FOR MANAGING PARTS AND INFORMATION FOR PARTS

BACKGROUND INFORMATION

1. Field

The present disclosure relates generally to parts and, in particular, to managing parts and information for the parts. Still more particularly, the present disclosure relates to a method and apparatus for identifying parts for objects.

2. Background

In manufacturing aircraft, many different parts are used to form structures for the aircraft. For example, parts may include skin panels, spars, fasteners, landing gear assemblies, ribs, system components, and other suitable parts for forming assemblies and/or installations for aircraft.

Maintenance is performed at various times during the life of an aircraft. As part of the maintenance, parts on an aircraft may be inspected, reworked, reconditioned, and/or replaced with new parts. These parts may be replaced due to wear and tear on current parts and/or to upgrade or reconfigure an aircraft to meet maintenance and regulatory requirements. Components, assemblies, and installations, such as landing gear assemblies, may be used on different aircraft of the same type.

For example, a landing gear assembly may be removed from an aircraft for maintenance. To avoid additional time when the aircraft is out of service, another landing gear system may be placed on the aircraft while maintenance is performed. After maintenance is performed, the reworked landing gear may be used on a different aircraft. As a result, different parts may be exchanged between different aircraft and between different airlines.

Part identifiers are used to track parts, such as landing gear assemblies, wings, and the components that are used to form those parts. Further, as different parts are received, the parts and assemblies for aircraft in which the parts may be used are identified.

Different manufacturers, airlines, maintenance organizations, and other entities may use different types of identification systems. Identifying parts in a database that uses different types of identifiers may increase the amount of time and/or effort needed to track the part as accurately as desired or may not be possible.

In some cases, information may be missing about a part, or the inventory at an entity may not correctly reflect what parts are present. As a result, entities may perform inventory reviews to identify what parts are present. These types of inventory reviews may take more time and effort than desired. Additionally, the time and effort may increase maintenance costs for aircraft.

Therefore, it would be advantageous to have a method and apparatus that takes into account at least some of the issues discussed above, as well as other possible issues.

SUMMARY

In one illustrative embodiment, a parts management system comprises a storage system, a database of codes stored in the storage system, and a computer system. The codes in the database are associated with parts. Each of the codes comprises a plurality of identifiers selected for use in identifying a particular part in the parts that is associated with each of the codes. The computer system is configured to receive a number of identifiers from an unidentified part. The computer system is configured to determine if the number of identifiers sufficiently matches a number of corresponding identifiers in the plurality of identifiers in a code in the codes that is associated with a part. The computer system is configured to access a repository storing related information for the parts to obtain the related information for the part using a code identified for the part.

In another illustrative embodiment, a parts management system comprises a storage system, a database of codes stored in the storage system, a repository, and a computer system. The codes in the database are associated with parts. Each of the codes comprises a plurality of identifiers selected for use in identifying a particular part in the parts that is associated with each of the codes. The repository stores related information for the parts. The related information for the parts is associated with the codes for the parts. The computer system is configured to receive a number of identifiers for an unidentified part. The computer system is configured to determine if the number of identifiers sufficiently matches a number of corresponding identifiers in the plurality of identifiers in a code in the codes that is associated with a part. The computer system is configured to access the repository storing the related information for the parts to obtain the related information for the part using the code identified for the part.

In yet another illustrative embodiment, a method is provided for managing parts. A number of identifiers is received for an unidentified part. A determination is made as to whether the number of identifiers sufficiently matches a number of corresponding identifiers in a plurality of identifiers in a code stored in a database of codes associated with parts. The code is associated with a part. In response to the number of identifiers matching the number of corresponding identifiers in the plurality of identifiers in the code, a repository storing related information for the parts is accessed to obtain the related information for the part using the code identified for the part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 1 is an illustration of an aircraft manufacturing and service method in accordance with an illustrative embodiment;

FIG. 2 is an illustration of an aircraft in which an illustrative embodiment may be implemented;

FIG. 4 is an illustration of a code in the form of a block diagram in accordance with an illustrative embodiment;

FIG. 5 is an illustration of a code in accordance with an illustrative embodiment;

FIG. 10 is an illustration of a data processing system in accordance with an illustrative embodiment.

DETAILED DESCRIPTION

Figure 3:
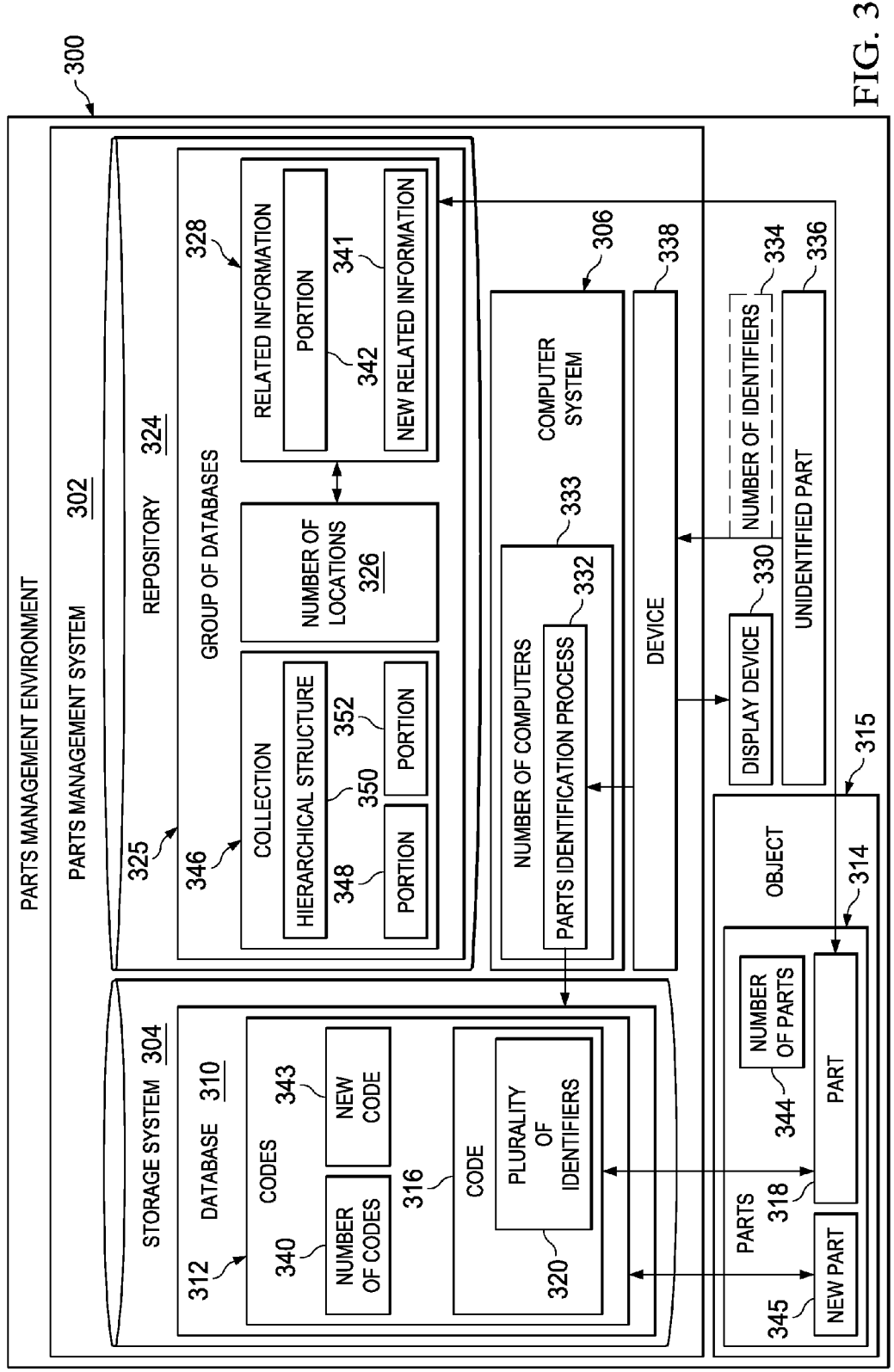
FIG. 3 is an illustration of a parts management environment in accordance with an illustrative embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, a maintenance facility, a rework facility, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

The different illustrative embodiments recognize and take into account a number of different considerations. For example, the different illustrative embodiments recognize and take into account that with the different systems for tracking parts used by different entities, the histories for the part and/or other information for those parts may be lost or may become inaccurate.

The different illustrative embodiments recognize and take into account that with the different types of systems used now, identification and verification of parts and their histories may take more time than desired. For example, verifications may occur when an aircraft or part is sold or leased from one airline to another airline. The amount of paperwork and information that is tracked for the parts on the aircraft and/or a configuration for the parts may increase the cost of selling an aircraft more than desired.

The different illustrative embodiments also recognize and take into account that parts and information related to the part may be located in many different locations within an entity. The different illustrative embodiments recognize and take into account that it may be desirable to have a system for tracking parts that have serial numbers and parts that do not have serial numbers. Further, the different illustrative embodiments recognize and take into account that parts may be located in many different locations within an entity. Further, different entities also may exchange parts with each other. These different entities may use different systems for identifying and tracking information about the parts.

Thus, the different illustrative embodiments provide a method and apparatus for identifying and tracking parts. In one illustrative embodiment, a parts management system comprises a storage system, a database of codes stored in the storage system, and a computer system. The codes in the database are associated with parts. Each of the codes comprises a plurality of identifiers selected for use in identifying a particular part in the parts that is associated with each of the codes.

The computer system is configured to receive a number of identifiers from an unidentified part. The computer system is configured to determine if the number of identifiers sufficiently matches a number of corresponding identifiers in the plurality of identifiers in a code in the codes that is associated with a part. Further, the computer system is configured to access a repository storing related information for the parts to obtain the related information for the part using the code identified for the part.

With reference now to FIG. 3, an illustration of a parts management environment is depicted in accordance with an illustrative embodiment. In these illustrative examples, parts management environment 300 includes parts management system 302. Parts management system 302 comprises storage system 304 and computer system 306.

As depicted, database 310 is stored in storage system 304. Codes 312 are stored in database 310 and are associated with parts 314. Parts 314 may be used in manufacturing and/or performing maintenance for object 315. Object 315 may be selected from one of, for example, without limitation, an aircraft, a wing, a landing gear assembly, a global positioning system receiver, a fuel pump, a wiring harness, an electronic flight bag, or some other suitable type of object.

As one illustrative example, object 315 may be aircraft 200 or a structure in aircraft 200 in FIG. 2. For example, parts management system 302 may be used to manage, identify, and/or track parts 314 for aircraft 200 in FIG. 2 during, for example, specification and design 102, material procurement 104, production, component and subassembly manufacturing 106, routine maintenance and service 114, and/or other processes in pre-production in aircraft manufacturing and service method 100 in FIG. 1.

Part 318 is an example of one of parts 314. Part 318 may be, for example, an assembly comprised of components that form the assembly. In other illustrative examples, part 318 may be a component in an assembly. In some cases, part 318 may be object 315. For example, when object 315 is an aircraft, part 318 may be the aircraft itself. When object 315 is a landing gear assembly, part 318 may be the landing gear assembly.

In these illustrative examples, part 318 may be, for example, without limitation, a wing, a spar, a fastener, a hinge, a fuselage, a frame, an overhead bin, a seat, an actuator system, an engine, a joint, a housing, a rod, a tail, a computer, a keyboard, a display device, a control panel, a door, or some other suitable type of part. Additionally, part 318 may take the form of a material, a raw material, a cast, paint, oil, fluid, a gas, a coolant, a tubing system, an opening, an aperture for a camera, a volume of space, a cavity, a layup of materials, and/or some other suitable type of part.

Of course, in some illustrative examples, part 318 may be used to provide a service. In other words, part 318 may be one or more operations that are performed for the service.

For example, part 318 may be one of a number of operations that is part of a service, a database storing information to provide the service, a wireless communications link, a protocol, a number of standards, a policy, a task, a work order, a document, a record, or some other suitable type of part. In still other illustrative examples, part 318 also may be a human being that is part of an organization. For example, part 318 may be an employee, a maintenance operator, a crew member, a pilot, a technician, or some other suitable type of person.

Related information 328 for parts 314 is stored in repository 324. Repository 324 may take the form of a number of data structures for storing related information 328. For example, repository 324 may take the form of group of databases 325. As used herein, a group of items is one or more items. For example, a group of databases is one or more databases. Related information 328 may be any information pertaining to or about parts 314. For example, related information 328 may include a history, a maintenance manual, assembly instructions, inspection instructions, a specification, and/or other information about parts 314.

In these depicted examples, group of databases 325 may be stored at various locations selected from at least one of a number of part manufacturers, a number of airlines, a number of maintenance providers, a number of vendors, and other suitable types of organizations. In some illustrative examples, one or more of group of databases 325 may be stored in storage system 304 along with database 310. In other illustrative examples, one or more of group of databases 325 may be stored in a storage system in parts management system 302 separate from storage system 304.

As one illustrative example, a portion of related information 328 stored in group of databases 325 may be for part 318. Related information 328 for part 318 may include various types of information for part 318. This information for part 318 may include, for example, without limitation, a history for part 318, information about part 318, information for operating part 318, information for manufacturing part 318, and/or other suitable information related to part 318.

For example, without limitation, related information 328 may include a number of identifiers for part 318, a timeline for the manufacturing of part 318, design data, specifications, a number of maintenance manuals, statistical data, requirements for manufacturing part 318, information for performing maintenance on part 318, a current location of part 318, a list of past locations for part 318, an identification of an assembly to which part 318 belongs, an identification of a component that forms part 318, a number of materials for part 318, and/or other suitable information.

In some cases, related information 328 includes information that may be used for performing operations on part 318 at a future time. As one illustrative example, a maintenance manual in related information 328 for part 318 may indicate how long after the installation of part 318 into an assembly an inspection of part 318 is to be performed.

Additionally, related information 328 includes information for part 318 recorded and/or tracked by various personnel and/or entities. An entity may be, for example, an organization, a corporation, a manufacturer, an owner, a vendor, a seller, a factory, an airline, a workshop, an airport, a control station, an aircraft, and/or some other suitable type of entity.

For example, when part 318 is an engine for an aircraft, related information 328 may include information for the engine provided by a manufacturer of the engine, an engineer that designed the engine, the airline for the aircraft in which the engine is currently located, a maintenance facility, an inspection team, an analyst, a pilot, or some other suitable type of person or entity.

Further, related information 328 may be updated over time for part 318. For example, when part 318 has not yet been formed, related information 328 may include a method for manufacturing part 318 and a list of raw materials to be used. After part 318 is manufactured, related information 328 for part 318 may include a date of completion for the manufacturing of part 318, a timeline for the manufacturing, and/or other suitable information.

Over time, information may be added to related information 328, removed from related information 328, and/or modified. In this manner, related information 328 for part 318 contains the most up-to-date information for part 318.

In this manner, related information 328 may have number of locations 326 in group of databases 325. In other words, related information 328 may be located in one or more of group of databases 325. Related information 328 stored in number of locations 326 is associated with code 316. In particular, the portion of related information 328 stored in each of number of locations 326 may be associated with code 316 for part 318. In some cases, number of locations 326 may be associated with code 316 for part 318.

For example, a location in number of locations 326 may be a file, a document, a log, a spreadsheet, a record in a spreadsheet, a table, a manual, a chart, or some other suitable type of location in group of databases 325. When a location in number of locations 326 is a file, the file may be associated with code 316 by code 316 being one of the properties for the file.

Code 316 is unique for part 318. In other words, no other part in parts 314 may have a code that is substantially the same as code 316. In these illustrative examples, code 316 comprises plurality of identifiers 320. Plurality of identifiers 320 is selected for use in identifying part 318 associated with code 316. Each identifier in plurality of identifiers 320 may comprise any number of letters, digits, characters, marks, and/or other suitable types of symbols. The particular combination of symbols used for each identifier in plurality of identifiers 320 may be selected for identifying part 318 and/or information in related information 328 for part 318.

In these illustrative examples, a location in number of locations 326 for related information 328 may be associated with code 316 using a number of different methods. As one illustrative example, a location in group of databases 325 for related information 328 may be "tagged" with code 316. For example, a record of information in related information 328 in one of group of databases 325 may be linked to or associated with code 316.

Parts identification process 332 runs on computer system 306 in these examples. In these illustrative examples, computer system 306 takes the form of number of computers 333. When more than one computer is present in number of computers 333, these computers may be in communication with each other. For example, the different computers may be networked. Number of computers 333 may be in locations selected from at least one of a number of part manufacturers, a number of airlines, a number of maintenance providers, a number of vendors, and other suitable types of organizations.

Parts identification process 332 provides access to database 310 storing codes 312 and to repository 324 storing related information 328 for parts 314 associated with codes 312. For example, parts identification process 332 may obtain related information 328 for part 318 using code 316.

Further, parts identification process 332 may be configured to receive number of identifiers 334 for unidentified part 336. In one illustrative example, parts identification process 332 receives number of identifiers 334 for unidentified part 336 from device 338. Device 338 may take the form of, for example, without limitation, a user input device, a scanner, a radio frequency identification (RFID) reader, a barcode scanner, an optical identification scanner, and/or some other suitable type of device.

In these illustrative examples, parts identification process 332 uses number of identifiers 334 to search group of databases 325 for related information 328 for unidentified part 336. When number of identifiers 334 sufficiently matches a plurality of identifiers for a code in codes 312, parts identification process 332 identifies unidentified part 336 as the part associated with this code.

As one illustrative example, number of identifiers 334 may sufficiently match plurality of identifiers 320 for code 316 associated with part 318. Parts identification process 332 identifies unidentified part 336 as part 318 makes an association between code 316 and unidentified part 336. Further, parts identification process 332 obtains related information 328 for part 318 using code 316.

In these illustrative examples, number of identifiers 334 may sufficiently match plurality of identifiers 320 for code 316 when number of identifiers 334 only matches code 316 and no other code in codes 312. In other words, all of number of identifiers 334 may not be present in any other code in codes 312 other than code 316. Number of identifiers 334 may sufficiently match plurality of identifiers 320 for code 316 by matching all of the plurality of identifiers 320 or a number of corresponding identifiers in plurality of identifiers 320.

However, in some illustrative examples, number of identifiers 334 may not sufficiently match a plurality of identifiers for a code in codes 312 to identify unidentified part 336. In these illustrative examples, parts identification process 332 may identify number of codes 340 in codes 312 containing number of identifiers 334. Parts identification process 332 then identifies portion 342 of related information 328 associated with number of codes 340.

Further, parts identification process 332 may display at least a portion of the information in portion 342 of related information 328 to an operator on display device 330. This information may be displayed on a graphical user interface on display device 330. In these illustrative examples, display device 330 may take the form of a monitor, a screen, a liquid crystal display (LCD), a projection device, a holographic display device, a touch screen, a head-mounted display device, and/or some other suitable type of display device.

In some cases, parts identification process 332 may display portion 342 of related information 328 to the operator in a manner that allows the operator to enter a new number of identifiers for number of identifiers 334 using the information in portion 342 of related information 328. In other examples, parts identification process 332 may display number of parts 344 associated with number of codes 340 in addition to or in place of portion 342 of related information 328. The operator may then select which of number of parts 344 is unidentified part 336.

In some illustrative examples, a part may already be identified. In these illustrative examples, number of identifiers 334 may be used to search group of databases 325 for related information for the identified part.

For example, a maintenance manual for a part that has already been identified may be needed. In particular, a maintenance manual for a landing gear assembly may be needed. Parts identification process 332 may use number of identifiers 334 to search group of databases 325 to obtain the maintenance manual for the landing gear assembly.

Further, in these illustrative examples, collection 346 also may be stored in repository 324. Collection 346 may be an arrangement of portion 348 of parts 314 representing an assembly in object 315 or object 315. Collection 346 may have hierarchical structure 350. For example, collection 346 may be a tree-type collection of portion 348 of parts 314 and portion 352 of codes 312 associated with portion 348 of parts 314.

Any number of collections may be stored in repository 324. Further, a part in parts 314 and the code associated with the part may be part of more than one collection stored in repository 324.

Additionally, parts identification process 332 may update database 310 for codes 312 with new code 343 for new part 345. Further, when new code 343 is added to new part 345, parts identification process 332 associates new code 343 with new related information 341 for new part 345.

In this manner, parts management system 302 provides a system for identifying a particular part in parts 314 using a code in codes 312 associated with the particular part. This system allows an operator to identify parts 314, related information 328, and new related information 341 for parts 314 more quickly and more efficiently as compared to currently available systems for identifying and tracking parts 314.

Codes 312 provides universal codes that may be used to access related information 328 stored in group of databases 325 for parts 314 without requiring knowledge of how the parts are identified in group of databases 325 or how the related information is associated with the parts. In this manner, the entities managing related information 328 stored in group of databases 325 may not need to manage codes 312 stored in database 310.

Further, codes 312 for parts 314 may be tracked over the full life cycles for parts 314 in these illustrative examples. In other words, code 316 may be recorded and/or tracked for part 318 even after part 318 is scrapped, recycled, salvaged, or disassembled.

The illustration of parts management environment 300 in FIG. 3 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, although the different illustrative embodiments have been described with respect to the aeronautical industry, parts management system 302 may be used in other types of industries. For example, parts management system 302 may be used in identifying parts used in the astronautic industry, the maritime industry, the automobile industry, the construction industry, the healthcare industry, and/or other suitable industries.

As one illustrative example, parts management system 302 may be used in the healthcare industry. In this illustrative example, parts 314 may include, for example, medical supplies, medical equipment, x-ray images, lab results, lab tests, blood samples, patients, employees, surgery schedules, hospital room assignments, clinic schedules, hospital food inventory, medical procedures, and/or other suitable parts.

Further, in some illustrative examples, codes 312 may be stored in a number of databases in addition to or in place of database 310. In other illustrative examples, codes 312 may be stored in repository 324 with related information 328 for parts 314.

With reference now to FIG. 4, an illustration of a code in the form of a block diagram is depicted in accordance with an illustrative embodiment. In these illustrative examples, code 400 is an example of one implementation for code 316 in codes 312 in FIG. 3. Code 400 may be for a part, such as part 318 in FIG. 3. Code 400 comprises plurality of identifiers 402.

As depicted, plurality of identifiers 402 includes commercial activity and government entity (CAGE) code 404, casting number 406, part number 408, serial number 410, universal product code (UPC) 412, color identifier 414, image identifier 416, manufacturer identifier 418, audio signature identifier 420, thermal signature identifier 422, and filler 424. Commercial activity and government entity code (CAGE) 404 is an identifier assigned by a government agency to a supplier that produces the part associated with code 400, a defense agency that produces the part, a supplier for the part, and/or some other suitable commercial and/or government entity that manufacturers and/or performs maintenance on the part.

Casting number 406 is an identifier assigned to a group of parts formed from a same cast. A cast may be, for example, a mold in which liquid metal is poured and allowed to solidify to form a part having a shape of the mold. Casting number 406 may provide an indication of who made the part associated with code 400, when the part was made, and/or for what purpose or object the part was made.

Part number 408 is an identifier for a type of part. Part number 408 may not be unique between different manufacturers. For example, two different manufacturers may use a same part number for two different types of parts produced by the two manufacturers. Serial number 410 is an identifier that may be unique for a particular part. For example, different parts having a same part number may have different serial numbers. Universal product code (UPC) 412 is an identifier that corresponds to a barcode.

Further, color identifier 414 is an identifier providing color information for the part associated with code 400. Image identifier 416 is an identifier for an image for the part. For example, image identifier 416 may comprise data for the image. This data may take the form of binary code in some illustrative examples. Further, manufacturer identifier 418 is an identifier for the manufacturer of the part associated with code 400.

Audio signature identifier 420 may identify, for example, without limitation, an operating frequency for a part, a voice identification for the part, and/or other information. Thermal signature identifier 422 may identify, for example, an operating temperature for the part.

In these illustrative examples, filler 424 provides a number of placeholders for a number of letters, digits, characters, marks, and/or other suitable types of symbols that may be added to code 400 at a later point in time.

The illustration of code 400 in FIG. 4 is not meant to imply limitations to the manner in which an illustrative embodiment may be implemented. For example, in other illustrative examples, other types of identifiers may be included in plurality of identifiers 402 in code 400 in addition to the identifiers described above. Further, in other illustrative examples, some identifiers, such as manufacturer identifier 418, filler 424, and image identifier 416 may not be present in plurality of identifiers 402 in code 400.

With reference now to FIG. 5, an illustration of a code is depicted in accordance with an illustrative embodiment. In this illustrative example, code 500 is an example of one implementation for code 400 in FIG. 4. Code 500 includes plurality of identifiers 502. As depicted, plurality of identifiers 502 include commercial activity and government entity (CAGE) code 504, casting number 506, part number 508, serial number 510, universal product code (UPC) 512, color identifier 514, image identifier 516, and filler 518.

Figure 6:
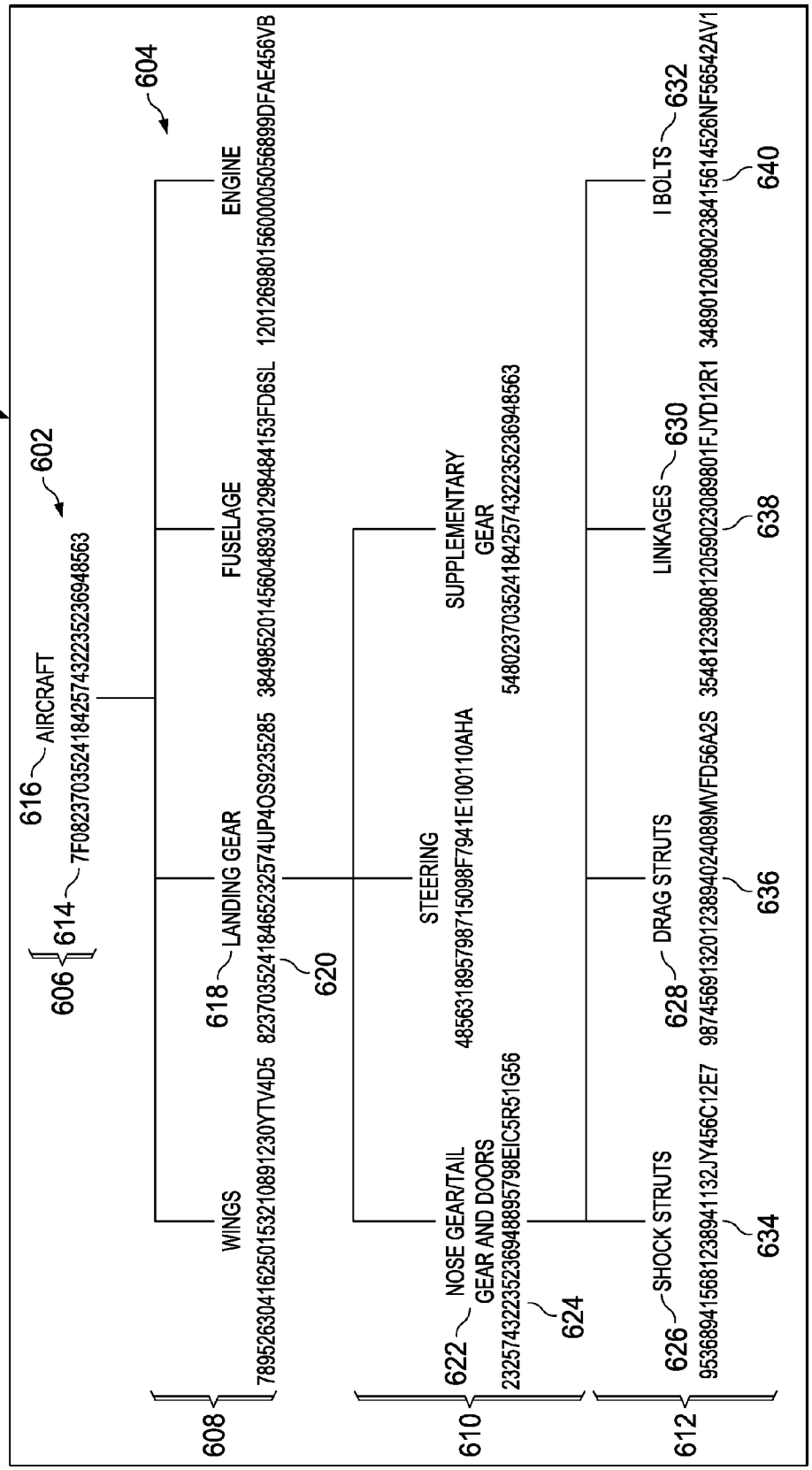
FIG. 6 is an illustration of a collection of codes in accordance with an illustrative embodiment.

With reference now to FIG. 6, an illustration of a collection of parts is depicted in accordance with an illustrative embodiment. In this depicted example, collection 600 is an example of one implementation for collection 346 of portion 348 of parts 314 and portion 352 of codes 312 in FIG. 3. Collection 600 is arranged in hierarchical structure 604 in this example.

As illustrated, hierarchical structure 604 has first level 606, second level 608, third level 610, and fourth level 612 for codes 602. Code 614 in first level 606 is associated with the object represented by collection 600. In this illustrative example, collection 600 represents aircraft 616.

As depicted, landing gear 618, associated with code 620 in second level 608, is an example of an assembly in aircraft 616. Further, nose gear, tail gear, and doors assembly 622, which is associated with code 624 in third level 610, is an example of an assembly in landing gear 618. Additionally, shock struts 626, drag struts 628, linkages 630, and bolts 632 are associated with code 634, code 636, code 638, and code 640, respectively, in fourth level 612. In these examples, shock struts 626, drag struts 628, linkages 630, and bolts 632 form nose gear, tail gear, and doors assembly 622.

Figure 7:
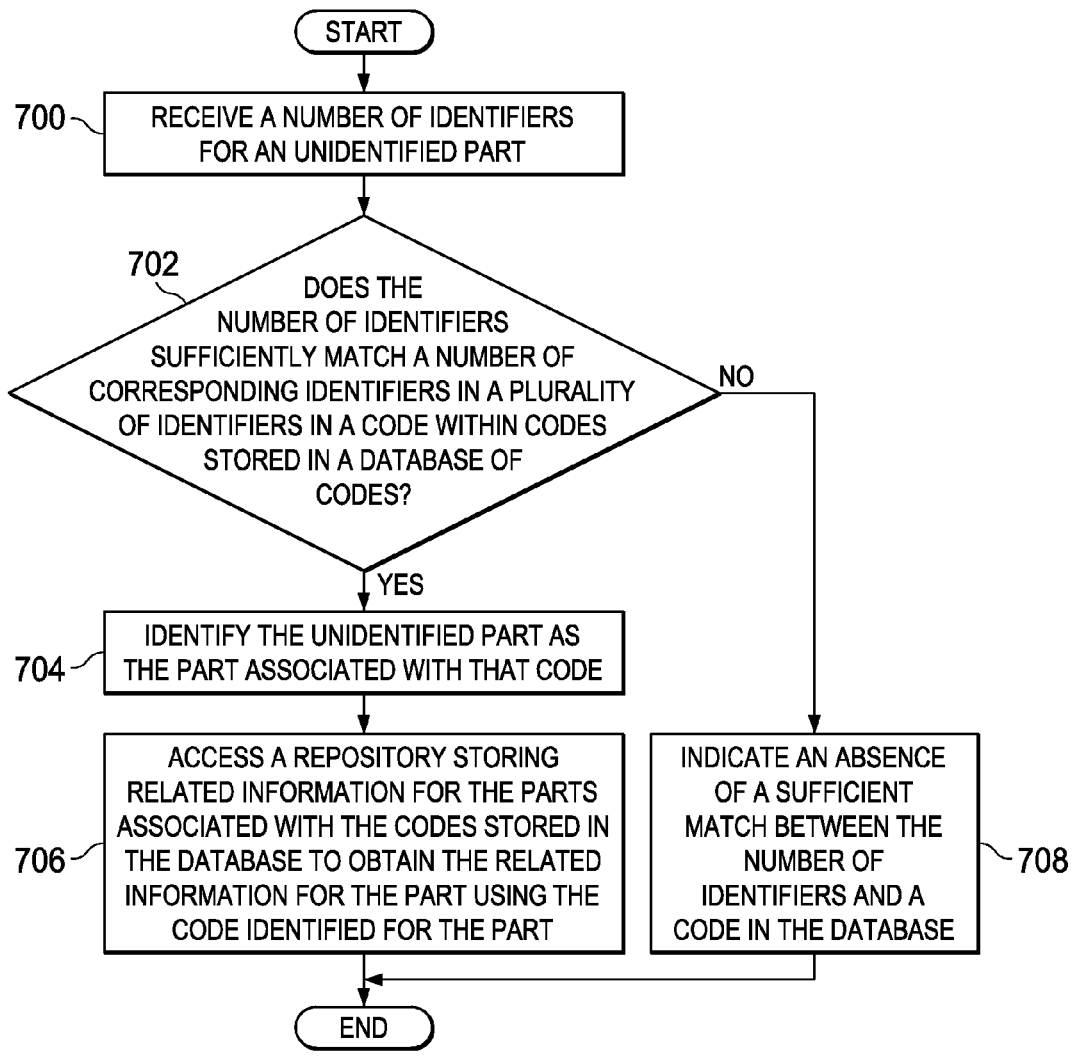
FIG. 7 is an illustration of a flowchart of a process for managing parts in accordance with an illustrative embodiment.

With reference now to FIG. 7, an illustration of a flowchart of a process for managing parts is depicted in accordance with an illustrative embodiment. The process illustrated in FIG. 7 may be implemented using parts management system 302 in FIG. 3.

The process begins by receiving a number of identifiers for an unidentified part (operation 700). In operation 700, the number of identifiers may be received in a number of different ways. For example, the number of identifiers may be received as user input entered by an operator using a user input device. In some illustrative examples, the operator may read the number of identifiers from the unidentified part using a barcode scanner, a radio frequency identification reader, an identification interrogator, or some other suitable type of device configured to obtain the number of identifiers from the unidentified part.

The process determines whether the number of identifiers sufficiently matches a number of corresponding identifiers in a plurality of identifiers in a code within codes stored in a database of codes (operation 702). The codes in the database are associated with parts. In particular, each code is associated with a particular part.

If the number of identifiers sufficiently matches a plurality of identifiers in a code stored in the database, the process identifies the unidentified part as the part associated with that code (operation 704). In other words, in operation 704, a match is identified between the unidentified part and the part associated with the code. Next, the process accesses a repository storing related information for the parts associated with the codes stored in the database to obtain the related information for the part using the code identified for the part (operation 706), with the process terminating thereafter.

With reference again to operation 702, if the number of identifiers does not sufficiently match a number of corresponding identifiers in a plurality of identifiers in a code stored in the database, the process indicates an absence of a sufficient match between the number of identifiers and a code in the database (operation 708), with the process terminating thereafter.

Figure 8:
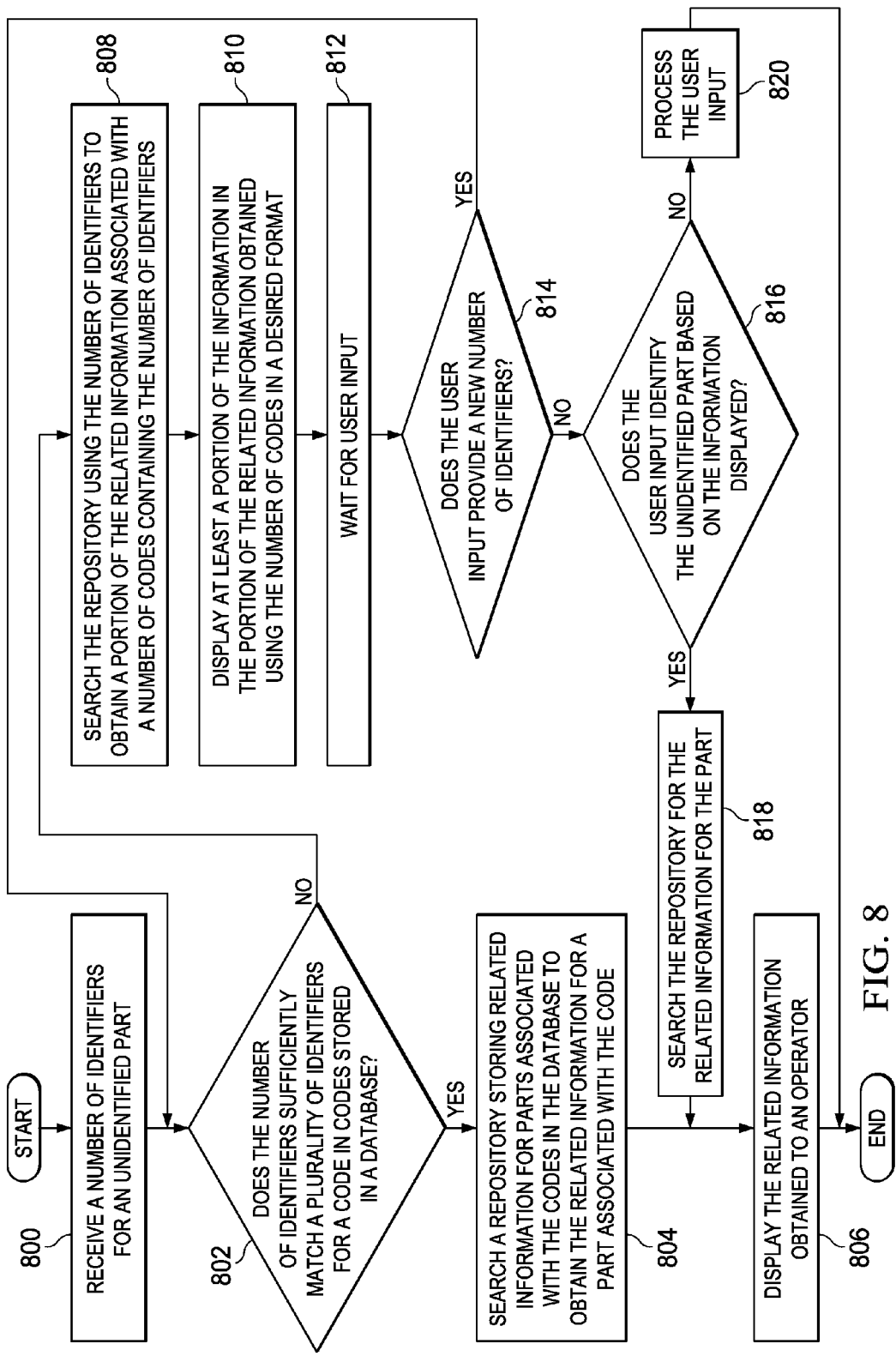
FIG. 8 is an illustration of a flowchart of a process performed in response to an indication that an unidentified part is not present in a database in accordance with an illustrative embodiment.

With reference now to FIG. 8, an illustration of a flowchart of a process for identifying a part is depicted in accordance with an illustrative embodiment. The process illustrated in FIG. 8 is a more-detailed process for the process illustrated in FIG. 7.

The process begins by receiving a number of identifiers for an unidentified part (operation 800). The process determines whether the number of identifiers sufficiently match a plurality of identifiers for a code in codes stored in a database (operation 802). In operation 802, the number of identifiers sufficiently matches the plurality of identifiers for a code when the number of identifiers matches only one code in the codes stored in the database and when the part associated with the part is the unidentified part.

If the number of identifiers sufficiently matches a plurality of identifiers for a code in the codes in the database, the process searches a repository storing related information for parts associated with the codes in the database to obtain the related information for a part associated with the code (operation 804). The process then displays the related information obtained to an operator (operation 806), with the process terminating thereafter. This information may be displayed on a graphical user interface on a display device.

With reference again to operation 802, if the number of identifiers does not sufficiently match a plurality of identifiers for a code in the codes in the database, the process searches the repository using the number of identifiers to obtain a portion of the related information associated with a number of codes containing the number of identifiers (operation 808). As one illustrative example, the number of identifiers received in operation 800 may be an image identifier. In particular, the image identifier takes the form of an image for the unidentified part in which the image is expressed in binary code.

In operation 802, the process determines whether the image identifier sufficiently matches an image identifier in a code for a part to identify the unidentified part. In particular, operation 802 may be performed using image recognition techniques, image matching techniques, and/or other suitable image processing techniques.

In some cases, the image identifier received may match an image identifier in more than one code. In these cases, the process determines that the image identifier does not sufficiently match a plurality of identifiers for a code in operation 802. In operation 808, the process may then search the repository for a portion of the related information associated with the codes containing the image identifier.

Thereafter, the process displays at least a portion of the information in the portion of the related information obtained using the number of codes in a desired format (operation 810). In operation 810, the process may display the images for the parts associated with the codes and/or other information in the portion of the related information for the parts associated with the codes. The desired format for the display may be based on, for example, a role of the operator requesting the identification of the unidentified part and/or other suitable factors. Further, the process may also display a list of the number of parts associated with the number of codes in operation 810. This and other information may be displayed on a graphical user interface.

The process then waits for user input (operation 812). The process determines whether the user input provides a new number of identifiers (operation 814). If the user input provides a new number of identifiers, the process returns to operation 802 as described above. Otherwise, the process determines whether the user input identifies the unidentified part based on the information displayed (operation 816). For example, the user input may be a selection of a part from a number of parts displayed.

If the user input identifies the unidentified part, the process searches the repository for the related information for the part (operation 818). The process then proceeds to operation 806 as described above.

With reference again to operation 816, if the user input does not identify the unidentified part, the process then processes the user input (operation 820), with the process terminating thereafter.

Figure 9:
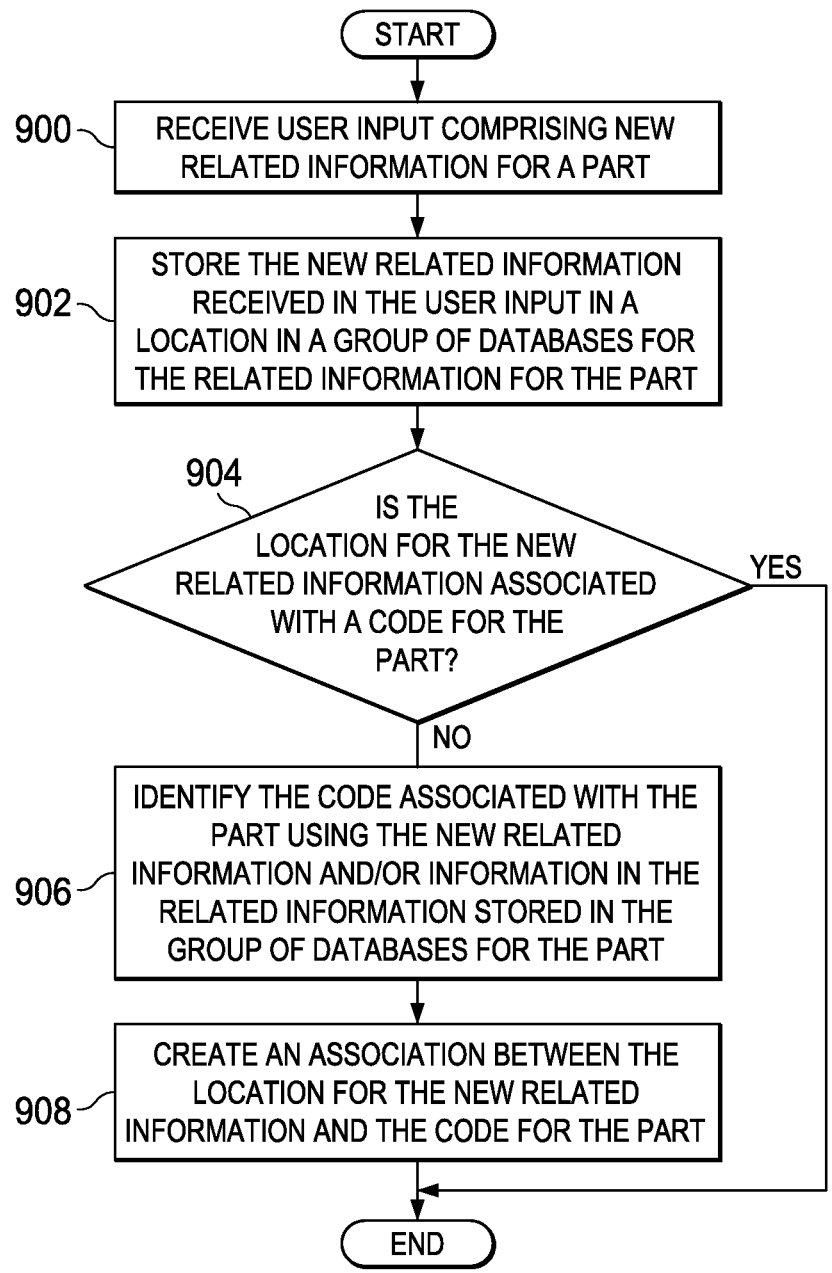
FIG. 9 is an illustration of a flowchart of a process for obtaining related information for a part in accordance with an illustrative embodiment.

With reference now to FIG. 9, an illustration of a flowchart of a process for associating related information for a part with a code for the part is depicted in accordance with an illustrative embodiment. The process illustrated in FIG. 9 may be implemented using parts management system 302 in FIG. 3.

The process begins by receiving user input comprising new related information for a part (operation 900). The new related information may be, for example, without limitation, maintenance data, manufacturing data, a serial number for a part, an analysis report, test data, and/or other suitable information for inclusion in the related information for the part.

The process then stores the new related information received in the user input in a location in a group of databases for the related information for the part (operation 902). The location may be, for example, a record in a spreadsheet, a spreadsheet, a table, a chart, a model, a file, a document, a log, a manual, or some other suitable location in the group of databases. Thereafter, the process determines whether the location for the new related information is associated with a code for the part (operation 904).

For example, the user input may include maintenance data to be added to a maintenance log in a database. The maintenance log is associated with the code for the part such that any maintenance data added to the maintenance log is also associated with the code for the part. As another example, the user input may be design data for a part that has not yet been formed. This design data may be stored in a new computer-aided design model in a database. This computer-aided design model may not already be associated with the code for the part.

If the location for the new related information is associated with the code for the part, the process terminates. Otherwise, the process identifies the code associated with the part using the new related information and/or information in the related information stored in the group of databases for the part (operation 906).

Thereafter, process creates an association between the location for the new related information and the code for the part (operation 908), with the process terminating thereafter.

In operation 908, the association may be in a number of different ways. As one illustrative example, when the location for the new related information is a record in a spreadsheet, the association may be created by adding the code for the part to the record. As another illustrative example, when the location is a document, the association may be created by adding the code in a header for the document.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added or removed in addition to the illustrated blocks in a flowchart or block diagram.

Turning now to FIG. 10, an illustration of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008.

Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000.

Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1006, or a cache, such as found in an interface and memory controller hub that may be present in communications fabric 1002.

Thus, the different illustrative embodiments provide a method and apparatus for identifying and tracking parts. In one illustrative embodiment, a parts management system comprises a storage system, a database of codes stored in the storage system, and a computer system. The codes in the database are associated with parts. Each of the codes comprises a plurality of identifiers selected for use in identifying a particular part in the parts that is associated with each of the codes.

The computer system is configured to receive a number of identifiers from an unidentified part. The computer system is configured to determine if the number of identifiers sufficiently matches a number of corresponding identifiers in the plurality of identifiers in a code in the codes that is associated with a part. Further, the computer system is configured to access a repository storing related information for the parts to obtain the related information for the part using the code identified for the part.

In this manner, the different illustrative embodiments provide parts management system 302 substantially real-time tracking of parts and information about parts. Parts management system 302 in FIG. 3 allows parts and/or information about parts to be identified more efficiently and quickly by an operator as compared to using currently available systems for identifying and tracking parts. As a result, manufacturing and/or maintenance operations may be performed more quickly and efficiently.

In particular, parts management system 302 in FIG. 3 allows an operator to access accurate information about a part as needed to improve quality of engineering and logistics support. For example, an operator may use a code, such as code 316 in FIG. 3, obtained from a part to search for related information of the part without needing to know where the related information for the part is located. Further, the operator may not need to have knowledge about how the part is identified in the related information for the part.

Parts management system 302 in FIG. 3 provides an integrated system for tracking design specifications, maintenance records, service records, and/or other suitable information in the related information for a part provided by a plurality of entities. In other words, the code stored for a part is a universal code that allows information for the part generated and/or stored by various entities to be accessed without requiring knowledge of how the information is indexed for the part. Further, parts management system 302 in FIG. 3 allows substantially real-time updates to be made to the related information for the parts and/or to the codes associated with the parts.

The description of the different illustrative embodiments has been presented for purposes of illustration and description and is not intended to be exhaustive or limited to the embodiments in the form disclosed. Many modifications and variations will be apparent to those of ordinary skill in the art.

Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A parts management system, the system comprising:
    a storage device;
    a database of codes stored in the storage device, wherein the codes in the database are associated with parts in which each of the codes comprises a corresponding plurality of identifiers strung together, wherein, for each of the plurality of identifiers, a given identifier in a particular string comprises a different type of identifier for a corresponding part relative to other identifiers in the particular string, the particular string being for a particular code in the codes; and
    a computer system configured to receive a number of identifiers for an unidentified part; determine if the number of identifiers sufficiently matches a number of identifiers in the particular string, wherein sufficiently matching comprises at least one of the number of identifiers matching at least one particular identifier in the particular string; the computer system being further configured to identify the unidentified part as an identified part based on sufficiently matching; and access a repository storing related information for the identified part;
    wherein, when the number of identifiers does not sufficiently match, the computer system is configured to obtain a portion of the related information associated with a number of codes containing the number of identifiers;
    wherein the computer system is configured to display at least a portion of the information in the portion of the related information obtained using the number of codes in a desired format;
    wherein, when a user input provides a new number of identifiers, the computer system is configured to determine if the new number of identifiers sufficiently matches the number of identifiers in the particular string;
    wherein, when the user input does not provide a new number of identifiers, the computer system is configured to determine if the user input identifies the unidentified part based on the information displayed; and
    wherein, when the user input identifies the unidentified part, the computer system is configured to search the repository for the related information and display the related information.

2. The parts management system of claim 1, wherein the related information for the identified part is associated with the particular code.

3. The parts management system of claim 1, wherein the related information for the identified part is stored in a number of locations in the repository for the identified part and wherein a portion of the related information stored at each of the number of locations is associated with the particular code.

4. The parts management system of claim 1,
    wherein the particular string is one of plurality of strings of a collection that is an arrangement of a number of parts representing one of an assembly or an object of an aircraft;
    wherein the collection has a hierarchical structure; and
    wherein the collection is a tree-type collection of the number of parts.

5. The parts management system of claim 1, wherein the plurality of identifiers comprises a part number, a serial number, a commercial activity and government entity code, a casting number, a universal product code, a color identifier, an image identifier, a manufacturing identifier, an audio signature identifier, and a thermal signature identifier.

6. The parts management system of claim 5, wherein the identified part is for an object selected from one of an aircraft, a wing, a landing gear assembly, a global positioning system receiver, a fuel pump, a wiring harness, and an electronic flight bag.

7. The parts management system of claim 1, wherein the related information for the identified part comprises a history for the identified part, information about the identified part, information for operating the identified part, information for performing maintenance for the identified part, identifiers for the identified part, a timeline for manufacturing the identified part, design data, specifications, a number of maintenance manuals, statistical data, requirements for manufacturing the identified part, a current location of the identified part, a list of past locations for the identified part, and a number of materials for the identified part.

8. The parts management system of claim 1, wherein the identified part is selected from one of an assembly comprised of components that form the assembly and a component in the assembly.

9. The parts management system of claim 1, wherein the related information for the identified part is stored in a number of locations in the repository for the identified part and wherein a location in the number of locations is associated with the particular code identified for the identified part.

10. The parts management system of claim 1, wherein a first particular identifier in the particular string is assigned by a first entity, wherein a second particular identifier in the particular string is assigned by a second entity different than the first entity, and wherein the first entity and the second entity use different systems for identifying and tracking information about the parts.

11. A method performed by a computer for managing parts, the method comprising:
    providing a database of codes stored in a storage device, wherein the codes in the database are associated with parts, in which each of the codes comprises a corresponding plurality of identifiers strung together, wherein, for each of the plurality of identifiers, a given identifier in a particular string comprises a different type of identifier for a corresponding part relative to other identifiers in the particular string, the particular string being for a particular code in the codes;
    receiving a first identifier for an unidentified part;
    comparing the first identifier to a first plurality of identifiers of the particular string;
    responsive to a match between the first identifier and at least one of the first plurality of identifiers, identifying the unidentified part as an identified part, accessing a repository storing related information for the parts to obtain the related information for the identified part;

when the first identifier does not sufficiently match, obtaining a portion of the related information associated with a number of codes containing the first identifier;

displaying at least a portion of the information in the portion of the related information obtained using the number of codes in a desired format;

when a user input provides a new first identifier, determining if the new first identifier sufficiently matches the first plurality of identifiers of the particular string;

when the user input does not provide a new first identifier, determining if the user input identifies the unidentified part based on the information displayed; and when the user input identifies the unidentified part, searching the repository for the related information and displaying the related information.

12. The method of claim 11, wherein the related information for the identified part is stored in a number of locations in the repository and wherein a portion of the related information stored at each of the number of locations is associated with the particular code identified for the identified part.

13. The method of claim 11 further comprising:

displaying at least a portion of the related information in a desired format in a graphical user interface; and receiving user input entered through the graphical user interface, wherein the user input comprises at least one of a selection that further identifies the unidentified part based on the portion of the related information displayed and a new number of identifiers for the unidentified part.

14. The method of claim 13 further comprising:

displaying a number of potential parts for the identified part in the graphical user interface.

15. The method of claim 14 further comprising:

receiving the user input entered through the graphical user interface, wherein the user input comprises a selection of one of the number of potential parts for the identified part.

16. The method of claim 11 further comprising:

receiving user input, wherein the user input comprises new related information for the identified part;

storing the new related information for the identified part in a location in the repository;

determining whether the location for the new related information is associated with a code for the identified part;

responsive to an absence of an association between the location for the new related information and the code for the identified part, identifying the code associated with the identified part using at least one of the new related information for the identified part and the related information stored in the repository for the identified part; and creating the association between the location for the new related information and the code identified for the identified part.

17. The method of claim 11, wherein receiving the first identifier comprises:

receiving the first identifier from a device, wherein the device is selected from at least one of a user input device, a scanner, a barcode scanner, a radio frequency identification reader, and an optical identification scanner.

18. The method of claim 11, wherein a first particular identifier in the particular string is assigned by a first entity, wherein a second particular identifier in the particular string is assigned by a second entity different than the first entity, and wherein the first entity and the second entity use different systems for identifying and tracking information about the parts.

* * * * *